(No Model.) 3 Sheets—Sheet 3.
J. S. TENNISON.
STORAGE CONDENSER AND LINT COTTON CONVEYER.
No. 555,189. Patented Feb. 25, 1896.

Witnesses.
Robert Everett
Thos. A. Gunn

Inventor:
John S. Tennison.
By James L. Norris.
Atty.

UNITED STATES PATENT OFFICE.

JOHN S. TENNISON, OF WACO, TEXAS, ASSIGNOR OF ONE-HALF TO WARREN A. PATTERSON, OF SAME PLACE.

STORAGE-CONDENSER AND LINT-COTTON CONVEYER.

SPECIFICATION forming part of Letters Patent No. 555,189, dated February 25, 1896.

Application filed June 13, 1895. Serial No. 552,724. (No model.)

*To all whom it may concern:*

Be it known that I, JOHN S. TENNISON, a citizen of the United States, residing at Waco, in the county of McLennan and State of Texas, have invented new and useful Improvements in Storage-Condensers and Lint-Cotton Conveyers, of which the following is a specification.

This invention has for its object to provide a new and improved storage-condenser and lint-cotton conveyer for forming lint-cotton into a bat or layer of greater or less depth or thickness and conveying the same to a point where the bat or layer can be delivered to cotton baling or pressing mechanism.

The invention also has for its object to provide novel, simple, and efficient means whereby a battery or batteries of gins can continuously discharge lint-cotton to a mechanism for conveying the same to a point in juxtaposition to cotton baling or pressing mechanism, and the necessity of stopping the gins during the time the bale is being tied, where a single press-box, or single pressing mechanism is used, is avoided, thus enabling the gins to continuously operate even when a single press-box or single baling or pressing mechanism is employed.

The invention also has for its object to provide new and improved means whereby the lint-cotton discharged from a battery or batteries of gins is accumulated or stored during the time a bale is being tied in the press-box or pressing mechanism and a single press is rendered capable of performing the work of two presses or of a press having a double press-box.

The invention also has for its object to provide novel means whereby the lint-cotton is accumulated during the time a bale is being tied in the baling or pressing mechanism, in such manner that the cotton bat is thicker at the beginning of the formation of the bale when the latter is small and pressure is greatest, for the purpose of evening the density of the bale.

The invention also has for its object to provide new and improved means for permitting the air to freely escape from the bat-forming apparatus in such manner that dirt and dust are eliminated from the lint-cotton, the latter is materially improved, and back-drafts or back-pressure of air in the gin-delivery flues are avoided.

To accomplish all these objects my invention involves the features of construction, the arrangement or combination of parts, and the principles of operation hereinafter described and claimed, reference being made to the accompanying drawings, in which—

Figure 2:
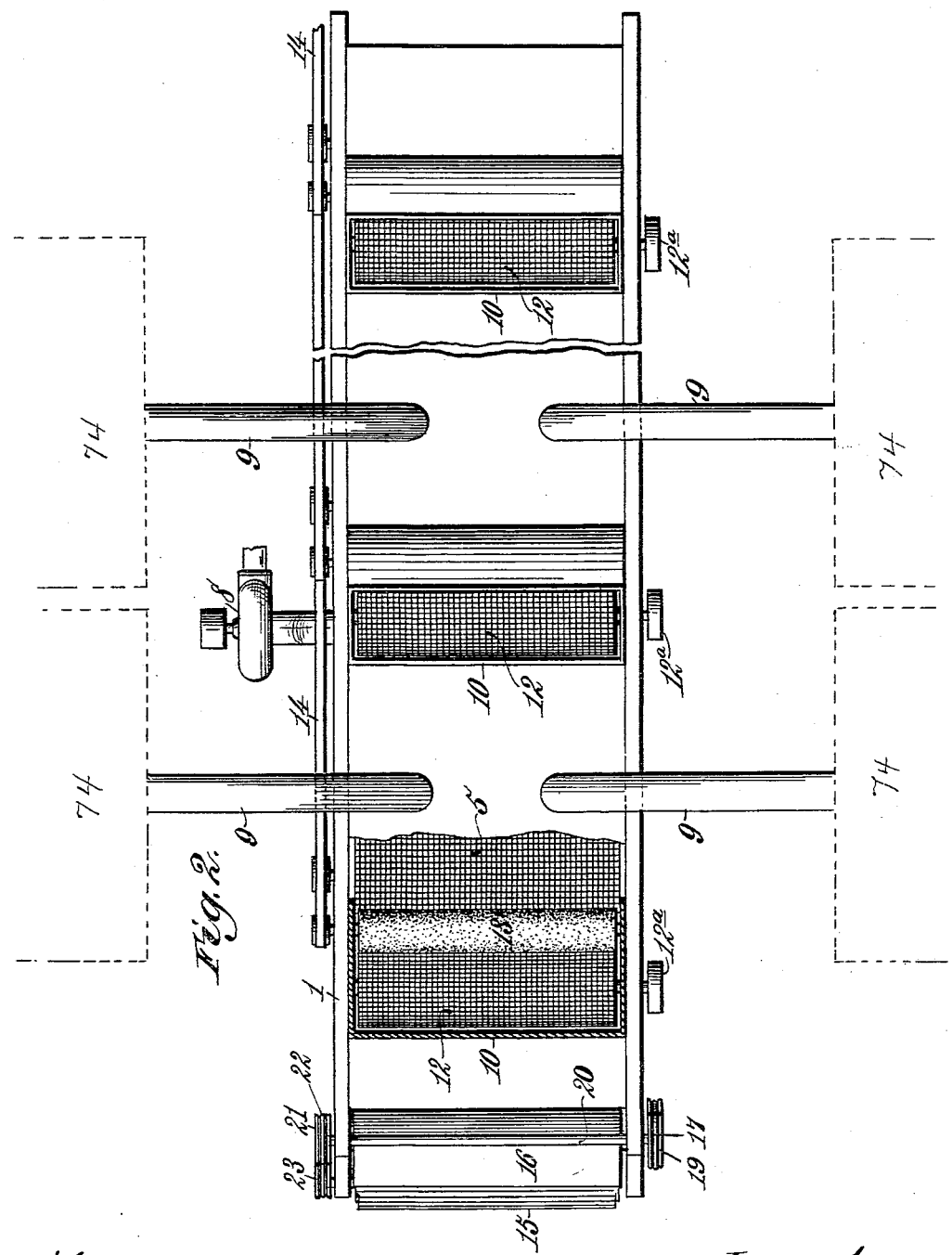
Figure 3:
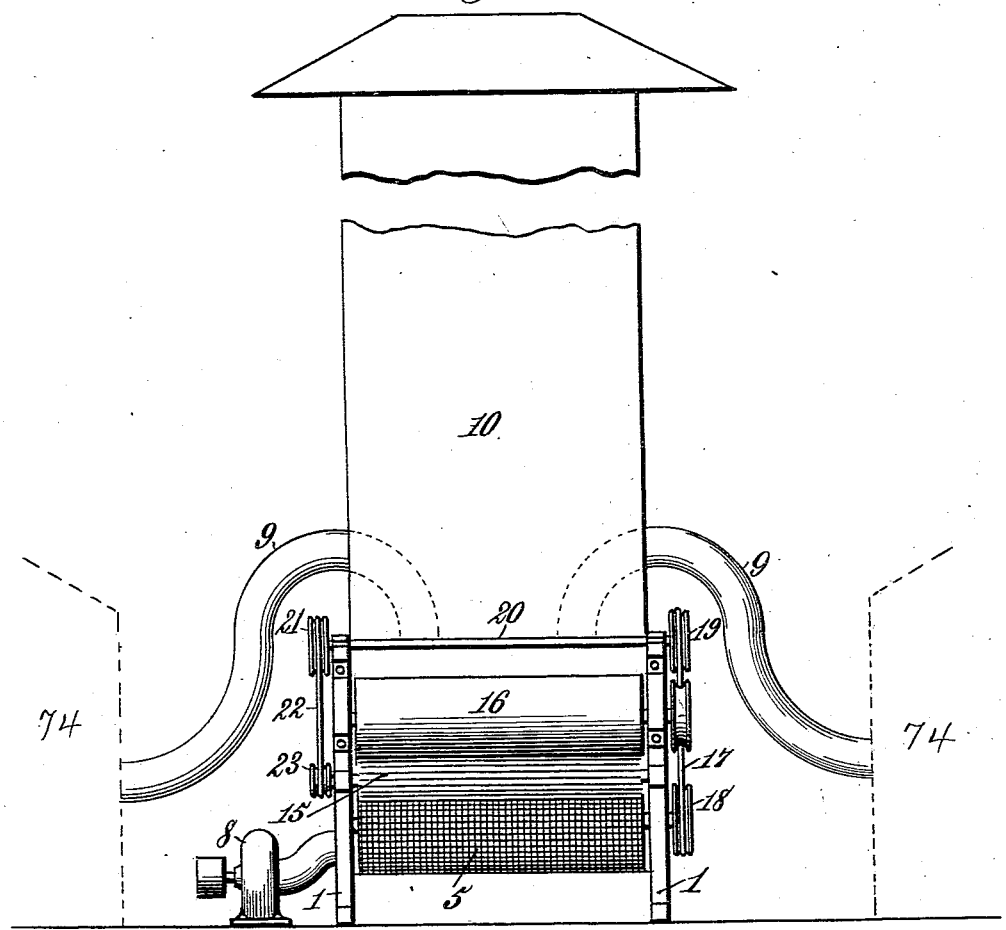
Figure 4:
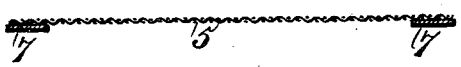

Figure is a longitudinal vertical sectional view of sufficient of a bat-forming apparatus to enable my invention to be clearly understood. Fig. 2 is a sectional plan view of the same. Fig. 3 is an end elevation, and Fig. 4 is a detail transverse sectional view, of a portion of the conveyer-belt.

In order to enable those skilled in the art to make and use my invention, I will now describe the same in detail, referring to the drawings, wherein—

The numeral 1 indicates a horizontal casing or trunk, preferably rectangular or square in cross-section, and of sufficient length to accommodate any desired number of gins constituting a battery or batteries of gins in the plant.

The casing or trunk may be of any form in cross-section suitable for the purpose in hand, and in each end thereof is journaled a drum 2, one of which may be horizontally adjusted through the medium of a screw-bolt 3 and nut 4.

The foraminous endless belt 5 extends around the drums 2, and the upper and lower stretches of the belt are supported at suitable intervals between the drums through the medium of supporting-rollers 6. The belt is of a width substantially the same as the width of the casing or trunk on its interior, and this belt is preferably composed of wire-cloth having its longitudinal edges bound with leather, as at 7, Fig. 4.

The upper and lower sets of supporting-rollers 6 serve to insure a level position of the upper and lower stretches of the endless belt. The space between the upper and lower stretches of the belt is in communication with an air-exhausting apparatus or air-exhaust fan 8, adapted to exhaust the requisite volume of air, which will cause the lint-cotton to settle lightly on the traveling foraminous belt when such cotton is delivered into the casing or trunk.

The casing or trunk is designed to be placed parallel to and between two lines of gins, as at 8ª, provided two batteries of gins are employed, but if only one battery of gins is used the casing or trunk will be located immediately in rear of the single line of gins.

In Fig. 3 I have indicated the casing or trunk arranged between two batteries of gins 74, and from these gins extend curved delivery conduits or pipes 9, through which the lint-cotton is delivered into the top portion of the casing or trunk.

The casing or trunk is provided with a plurality of air-flues 10, in juxtaposition to the lower end portion of each of which is journaled a rotary foraminous drum or cylinder 12, preferably composed of wire-screening, and so arranged that approximately one-half the circumference of the drum or cylinder lies inside the casing or trunk, while the other half lies in the lower end portion of the air-flue 10.

The shafts of the drums or cylinders 12 can be rotated in any suitable manner, but I prefer to provide the shafts with pulleys 12ª, Fig. 2, adapted to be belted together for the purpose of rotating the drums or cylinders.

The air-flues all communicate with the external atmosphere, and the foraminous cylinders permit the free escape of the greater portion of the air discharged into the casing or trunk by the gins.

A rotary brush 13 is journaled in juxtaposition to each foraminous cylinder 12, so that the surface of the brush rotates in contact with the cylinder and brushes therefrom any adhering lint-cotton. The brushes 13 and the foraminous cylinders 12, which are kept clean by the brushes, serve to eliminate dirt and dust from the cotton, and the latter is much improved thereby. The brushes 13 can be rotated through the medium of a belt 14 or by any mechanism suitable for the purpose.

One of the drums 2 is designed to be rotated by any suitable mechanism, so that a traveling motion is imparted to the foraminous endless belt.

The casing or trunk is provided at one end with a wiper-roll 15, having strips of suitable material to wipe or brush adhering lint-cotton from the foraminous belt and cause the cotton to pass between the wiper-roller and a plain-surfaced pressure-roll 16, journaled above the wiper-roll and driven by a belt 17, engaging a pulley 18 on the shaft of the drum 2 at the end of the casing or trunk, where the wiper-roll 15 is journaled. The belt 17 passes over a pulley 19 on one end of a shaft 20, the opposite end of which is provided with a pulley 21, connected by a belt 22 with a pulley 23 on the wiper-roll 15.

The connections above described serve to impart rotary motion to the rolls 15 and 16, so that the cotton bat issuing from between these rolls can be delivered through the medium of any suitable mechanism to a cotton baling or compressing mechanism.

I do not wish to be understood as confining myself to any particular means for rotating the brushes 13, wiper-roll 15, and plain roll 16, as these parts may be rotated in any suitable manner.

The devices for adjusting one of the drums 2 horizontally renders it possible to maintain the foraminous endless belt 5 in a stretched condition, which is desirable for the perfect operation of the apparatus.

The endless belt constitutes a conveyer by which the lint-cotton deposited in a bat of greater or less thickness is conveyed to the wiper-roll 15 and plain roll 16 for delivery to the cotton baling or pressing mechanism.

The improved storage-condenser and lint-cotton conveyer is designed to be used more particularly in connection with what are known as "roller-presses," or presses in which a cylindrical bale of cotton is formed and is pressed while being formed; but obviously my invention can be employed with advantage in connection with cotton-baling presses of any type whatever—such, for instance, as presses which make square bales.

In the practical operation of my improved storage-condenser and lint-cotton conveyer the lint-cotton passes directly from the battery or batteries of gins into the upper portion of the casing or trunk, and the air delivered into the casing or trunk by the gin freely escapes through the foraminous cylinders 12 into the air-flues 10, except such portion of the air as is drawn down through the meshes of the foraminous belt by the action of the air-suction apparatus or exhaust-fan 8, for causing the lint-cotton to lightly settle on the belt. The lint-cotton is moved forward by the traveling movement of the foraminous belt to the point where it passes out between the wiper-roll 15 and plain roller 16. The passage of the cotton between the wiper-roll 15 and the plain roller 16 continues until a bale is formed in the cotton-baling press, (not necessary to illustrate,) and when the bale is ready to be tied the driving mechanism of the foraminous belt is stopped, and consequently the wiper-roll 15 and plain roller 16 also cease to rotate. By this means the lint-cotton delivered by the gins into the casing or trunk accumulates on the foraminous belt until such time as the cotton-baling press is ready to receive the bat of cotton, whereupon the driving mechanism of the foraminous belt is started and the belt is again caused to move forward.

The foraminous cylinders 12, arranged in the lower portions of the air-flues 10, provide ample means for the free escape of the air delivered into the casing or trunk by the battery of gins. I find these foraminous cylinders more advantageous and effectual than ordinary fixed screens, particularly because the cylinders can be kept free from adhering cotton by the rotary brushes, and, further, they provide a freer escape for the air.

By my invention I avoid the necessity of stopping the gins during the time a bale is being tied, where a single press-box or single pressing mechanism is used, and enable the gins to continuously operate even when a single press-box or single baling or pressing mechanism is employed to form the bales. It will be obvious, therefore, that one press is capable of performing the work of two presses in that system of baling cotton at the gin-plant where the gins continuously rotate.

Inasmuch as the passage from each and every gin in the plant is exactly the same, I am able to secure exactly the same results from each gin, and, furthermore, the storage of the lint-cotton while a bale is being tied provides a thicker bat to start the next bale, so that a thicker bat is provided when the bale is small and when the pressure is greatest, thereby evening up the density of the bale.

The pressure-roller 16 is designed to yield vertically through the medium of any suitable means. This may be accomplished by adapting the journals of the pressure-roller to move vertically in their bearings, whereby the pressure-roller rolls the bat of cotton down from its light and fluffy condition, and causes it to readily pass to the cotton baling or pressing mechanism.

Figure 1:
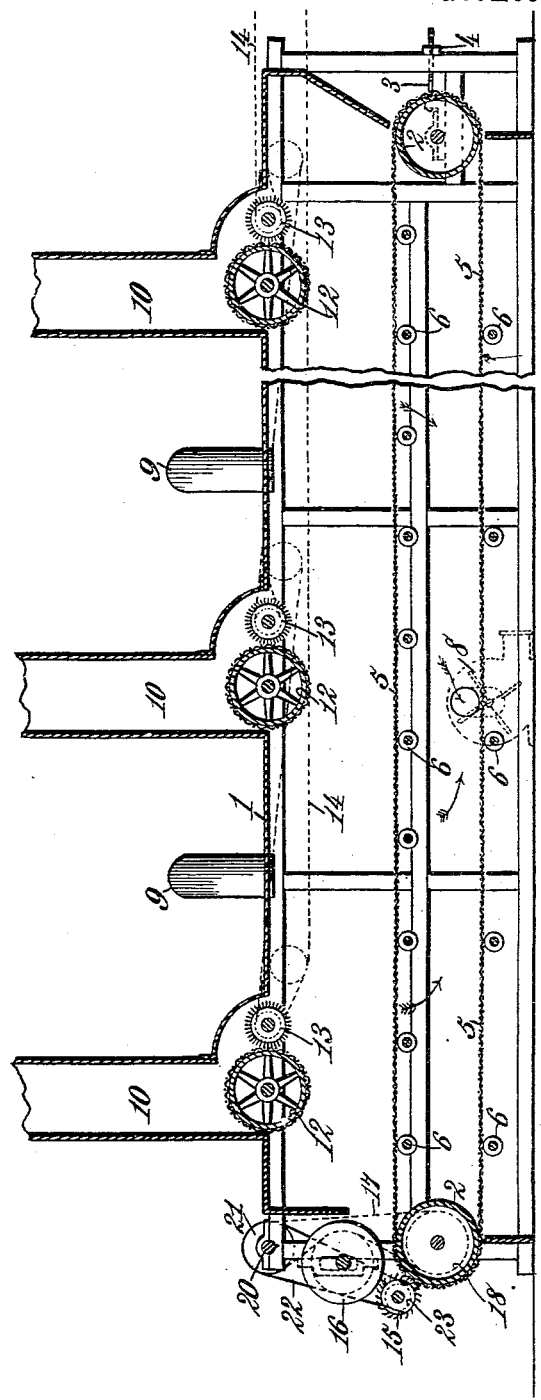

In practice the casing or trunk will be of considerable length, and therefore I have broken away Fig. 1 of the drawings, so that only end parts of the trunk or casing are illustrated.

The number of air-flues and the cylinders 12 can be increased or diminished to any desired extent, but I preferably employ such a number that a delivery conduit or pipe 9 from each gin will enter the casing or trunk between each pair of air-flues, as will be clearly understood by reference to the drawings.

The improved storage-condenser and lint-cotton conveyer provides novel, simple, efficient, and economical means for forming lint-cotton into a bat or layer of greater or less depth or thickness and conveying the same to a point where the bat or layer can be transferred to a cotton baling or pressing mechanism of any suitable construction.

The provision of the air-flues 10 and foraminous cylinders 12 permits the ready escape of the air forced into the casing or trunk by the gins, and consequently back-drafts or back-pressures in the gin-flues are entirely avoided.

While I have hereinbefore mentioned and illustrated in the drawings that the cotton is introduced into the trunk at the top thereof, it will be evident that it can be introduced at the side or sides of the trunk with equal facility and without departing from the scope of my invention.

Having thus described my invention, what I claim is—

1. In an apparatus for condensing and delivering lint-cotton to a baling or pressing mechanism, the combination with a casing or trunk having air-outlets and lint-cotton inlets, and a suitable conveyer arranged within the casing or trunk, of foraminous drums or cylinders arranged in juxtaposition to the air-outlets, and suitable devices for removing adhering lint-cotton from said drums or cylinders, substantially as described.

2. In an apparatus for condensing and delivering lint-cotton to a baling or pressing mechanism, the combination with a casing or trunk having air-outlets, and lint-cotton inlets, and a suitable conveyer arranged within the casing or trunk, of foraminous drums or cylinders arranged in juxtaposition to the air-outlets, and brushes for removing adhering lint-cotton from said drums or cylinders, substantially as described.

3. In an apparatus for condensing and delivering lint-cotton to a baling or pressing mechanism, the combination with a plurality of gins, a casing or trunk having air-outlets and lint-cotton inlets connected with said gins, and a suitable conveyer arranged within the casing or trunk, of foraminous drums or cylinders arranged in juxtaposition to the air-outlets, and rotary brushes for removing adhering lint-cotton from said drums or cylinders, substantially as described.

4. In an apparatus for condensing and delivering lint-cotton to a baling or pressing mechanism, the combination with a plurality of gins, a casing or trunk having air-outlets and lint-cotton inlets connected with said gins, of foraminous drums or cylinders having portions of their circumference arranged in the air-outlets, and the remaining portions of their circumference arranged in the casing or trunk, and brushes for removing adhering lint-cotton from the drums or cylinders, substantially as described.

5. In an apparatus for condensing and delivering lint-cotton to a baling or pressing mechanism, the combination with a casing or trunk having air-outlets and lint-cotton inlets, of a traveling foraminous belt moving in the casing or trunk, a wiper-roller for removing adhering lint-cotton from the belt, a roller co-operating with the wiper-roller to press the lint-cotton for the delivery thereof to a baling or pressing mechanism, and screens arranged in juxtaposition to the air-outlets of the casing or trunk to permit the free escape of air while preventing the escape of cotton, substantially as described.

6. In an apparatus for condensing and delivering lint-cotton to a baling or pressing mechanism, the combination with a casing or trunk having air-outlets and lint-cotton inlets, of a foraminous conveyer-belt arranged in the casing or trunk, a wiper-roller for removing adhering lint-cotton from the belt, a pressure-roller for pressing the cotton, foraminous drums or cylinders arranged in juxtaposition to the air-outlets, and brushes for removing adhering lint-cotton from said drums or cylinders, substantially as described.

7. In an apparatus for condensing and delivering lint-cotton to a baling or pressing mechanism, the combination with a casing or trunk having air-outlets and lint-cotton inlets adapted to connect with a battery, or batteries of gins, of an endless foraminous belt moving in the casing or trunk, and an air-exhausting apparatus communicating with the lower portion of the casing or trunk to exhaust the desired volume of air and cause the lint-cotton to settle lightly on the belt, substantially as described.

8. In an apparatus for condensing and delivering lint-cotton to a baling or pressing mechanism, the combination with a casing or trunk having air-outlets and lint-cotton inlets, of foraminous drums or cylinders arranged in juxtaposition to the air-outlets, brushes for removing adhering lint-cotton from said drums or cylinders, an endless foraminous belt traveling in the casing or trunk, an air-exhausting apparatus for exhausting the desired volume of air from the lower portion of the casing or trunk and thereby causing the lint-cotton to settle lightly on the belt, a wiper-roller for removing adhering lint-cotton from the belt, and a pressure-roller arranged to press the cotton for its delivery to a cotton baling or pressing mechanism, substantially as described.

9. A storage-condenser and lint-cotton conveyer, consisting of the following elements, to wit: a casing or trunk having a plurality of air-outlets and lint-cotton inlets, a traveling, foraminous belt moving in the casing or trunk, a foraminous drum or cylinder arranged in juxtaposition to each air-outlet, a brush arranged in operative connection with each drum or cylinder for removing adhering lint-cotton therefrom, and means for pressing the fluffy bat of cotton as it comes from the foraminous belt, substantially as described.

10. A storage-condenser and lint-cotton conveyer, consisting of a casing or trunk having a plurality of air-outlets and lint-cotton inlets, a foraminous drum or cylinder arranged in juxtaposition to each air-outlet, a brush for removing adhering lint-cotton from each drum or cylinder, an endless, foraminous belt moving in the casing or trunk, an air-exhausting apparatus connected with the lower portion of the casing or trunk for the purpose of exhausting the desired volume of air to cause the lint-cotton to settle lightly on the belt, a wiper-roller for removing adhering lint-cotton from the belt, and a pressure-roller for pressing the fluffy bat of cotton as it comes from the belt, substantially as described.

11. The combination with a casing or trunk having air-outlets and lint-cotton inlets, of rotary, foraminous drums or cylinders journaled in juxtaposition to the air-outlets, rotary brushes for removing adhering lint-cotton from the drums or cylinders, a traveling, foraminous belt moving in the casing or trunk, a wiper-roller for removing adhering lint-cotton from the belt, and a pressure device for acting on the fluffy cotton as it comes from the belt, substantially as described.

In testimony whereof I have hereunto set my hand in presence of two subscribing witnesses.

JOHN S. TENNISON.

Witnesses:
T. J. PRIMM,
LEE PRATHER.